United States Patent
McLaughlin (12)

(10) Patent No.: US 6,279,393 B1
(45) Date of Patent: Aug. 28, 2001

(54) SYSTEM FOR ISOTROPICALLY MEASURING FLUID MOVEMENT IN THREE-DIMENSIONS

(75) Inventor: Patrick L. McLaughlin, Salt Lake City, UT (US)

(73) Assignee: Mountain High E&S, Redmond, OR (US)

( * ) Notice: Subject to any disclaimer, the term of this patent is extended or adjusted under 35 U.S.C. 154(b) by 0 days.

(21) Appl. No.: 09/379,948

(22) Filed: Aug. 24, 1999

(51) Int. Cl.$^7$ ............................... G01F 13/00; G01P 5/00
(52) U.S. Cl. .......................................................... 73/170.14
(58) Field of Search ........................... 73/861.42, 861.45, 73/861.47, 861.52, 861.55, 861.56, 861.65, 861.66, 170.01, 170.11, 170.14

(56) References Cited

U.S. PATENT DOCUMENTS

| | | |
|---|---|---|
| 2,645,123 | 7/1953 | Hundstad . |
| 3,359,794 | 12/1967 | Rosenberg . |
| 3,695,103 | 10/1972 | Olson . |
| 4,488,431 | 12/1984 | Miga . |
| 4,631,958 | 12/1986 | Van Cauwenberghe et al. . |
| 4,635,474 | 1/1987 | Blackwood . |
| 4,920,808 | 5/1990 | Sommer . |
| 5,117,687 | 6/1992 | Gerardi . |
| 5,262,773 | 11/1993 | Gordon . |
| 5,262,782 | 11/1993 | Rubin et al. . |
| 5,435,178 | 7/1995 | Edwards . |
| 5,638,298 | 6/1997 | Edwards . |

Primary Examiner—William Oen
(74) Attorney, Agent, or Firm—Morriss, Bateman, O'Bryant & Compagni

(57) ABSTRACT

A system for measuring wind direction and velocity utilizing a sphere which is capable of making differential orthogonal pressure measurements, using pressure sensors located inside the sphere along apertures forming orthogonal axes of the sphere. The preferred embodiment applies the Bernoulli principle to the sphere which has the apertures disposed along the orthogonal axes, and which measures the wind velocity and direction, whereas an alternative embodiment applies the Reynold's principle by using a sphere having no apertures therein, and resulting in a more robust meteorological measurement device which can also measure other meteorological data which is combined with the wind data to produce forecasting of air and weather patterns in a localized area.

33 Claims, 12 Drawing Sheets

SYSTEM FOR ISOTROPICALLY MEASURING FLUID MOVEMENT IN THREE-DIMENSIONS

BACKGROUND

1. The Field of the Invention

This invention relates generally to fluid flow measurements. More specifically, the invention relates to a system for measuring wind movement in three dimensions, thereby enabling a user to not only measure wind velocity and direction, but other meteorological information which can be derived therefrom, including the measurement of severe wind conditions such as wind shear.

2. The State of the Art

The state of the art in three dimensional fluid flow measurements is replete with examples of devices which attempt to determine the direction and velocity of wind. However, there are many different approaches which have been attempted. Furthermore, these different approaches have been met with varying degrees of success. In addition, some of these approaches are not suitable for severe weather conditions.

A brief examination of some of the prior art is provided in order to illustrate some of the shortcomings thereof. Beginning with U.S. Pat. No. 3,359,794 issued to Rosenberg, the patent apparently teaches a plurality of thermistors which are coupled to the outside of a sphere. The thermistors measure an increasing temperature of the fluid (in this case water) as it flows around the current meter. This information is used to determine a flow direction and velocity. It is observed that the fluid must be of a type which will measurably rise in temperature as it flows around the sphere. Among other things, a substantial number of thermistors must be used. The patent also states that it is specifically intended for determining current data for a liquid.

In U.S. Pat. No. 3,695,103 issued to Olson, the patent teaches a buoyant sphere which is floating in a medium (liquid). The sphere is tethered to cables which have strain gauges. This application is also directed to liquid applications.

In U.S. Pat. No. 4,488,431 issued to Miga, the patent teaches a wind speed and direction device which is very similar to anemometers such as the one shown in FIG. 1.

FIG. 1 is provided to illustrate the problems with a state of the art anemometers 2 and wind vanes 4. For example, because it is mechanical, light wind conditions might not overcome the frictional component of the wind vane. The result is an increasingly incorrect and sluggish response of the vane 4. As is typical of mechanical sensors, they become non-responsive or slow to respond at low wind speeds. The anemometer 2 suffers from being inaccurate in light wind conditions, and being slow to respond to quickly changing conditions. Furthermore, both devices can easily fail in severe weather conditions such as icing or snow.

In U.S. Pat. No. 4,920,808 issued to Sommer, the patent teaches a device for measuring wind direction and velocity. However, the method and apparatus are unnecessarily complicated by the use of a body other than a sphere. Among other things, the patent also teaches having different systems for determining flow direction and velocity. For example, the device requires a servo-motor and other high maintenance parts for determining direction of flow, and other sensors for calculating the velocity.

There are other teachings in U.S. Pat. No. 4,631,958 issued to Van Cauwenberghe et al, in U.S. Pat. No. 4,635,474 issued to Blackwood, and in U.S. Pat. No. 5,117,687 issued to Gerardi, all of which operate using different principles of operation, and which are designed to determine wind velocity and direction.

What is needed is a system for isotropically measuring the direction and velocity of wind which is substantially less complicated than the prior art. It would be another advantage if the system could also be modified to withstand the elements so that measurements can be made in hostile environments. What is also needed is a system which can be linked together from a plurality of measurement stations to thereby use data which is accumulated about a larger area to thereby make predictions and/or actual measurements of dangerous wind conditions such as wind shear by extrapolating data therefrom.

OBJECTS AND SUMMARY OF THE INVENTION

It is an object of the present invention to provide a system which accurately and inexpensively measures wind direction and velocity.

It is another object to provide a system which can measure wind direction and velocity using a sensor which does not have moving parts.

It is another object to provide a system which in addition to wind data, can also determine other atmospheric conditions, including pressure, temperature and relative humidity.

It is another object to provide a system which measures wind direction and velocity by measuring and analyzing pressure differentials on the surface of a sphere.

It is another object to provide a system which determines wind direction and velocity using differential orthogonal pressure measurements.

It is another object to provide a system which determines wind direction and velocity by utilizing three orthogonal axis pressure measurements to thereby determine both the horizontal and the vertical components of air motion.

It is another object to provide a system which determines wind direction and velocity which utilizes a sphere having apertures through which air is able to pass.

It is another object to provide a system which determines wind direction and velocity which utilizes a sphere having no apertures in the surface.

It is another object to provide a system which determines wind direction and velocity which is able to operate in severe and hostile environments.

It is another object to provide a system which determines absolute and time varying quantities of pressure, temperature and humidity.

It is another object to provide a system which determines wind direction and velocity in a localized area which can be used to detect short term but severe wind conditions.

It is another object to provide a system which determines atmospheric conditions including wind direction and velocity, to thereby generate a three-dimensional description of air and weather patterns in the local area.

It is another object to provide a system which determines the direction and velocity of any fluid which is capable of flowing around a measurement sphere, and producing differential pressures.

The present invention is a system for measuring wind direction and velocity utilizing a sphere which is capable of making differential orthogonal pressure measurements, using pressure sensors located inside the sphere along apertures forming orthogonal axes of the sphere. The preferred embodiment applies the Bernoulli principle to the sphere which has the apertures disposed along the orthogonal axes, and which measures the wind velocity and direction, whereas an alternative embodiment applies the Reynold's principle by using a sphere having no apertures therein, and resulting in a more robust meteorological measurement device which can also measure other meteorological data which is combined with the wind data to produce forecasting of air and weather patterns in a localized area.

In a first aspect of the invention, the preferred embodiment applies the principle that pressure differences occur on opposite sides of the sphere and along the axis of the flow, and that the pressure difference is a function of the velocity and the viscosity of the flow and the angle difference with respect to the points of measurement of the sphere.

In a second aspect of the invention, the sphere with apertures along orthogonal axes generally operates on the Bernoulli principle, where a sphere having three bipolar pneumatic ports is used to directly measure the vector pressure differentials as seen isotropically over the entire surface of the sphere.

In a third aspect of the invention, the sphere has no apertures therethrough, but generally operates on the Reynolds principle, where the sphere is disposed upon a set of orthogonally arranged gimbals, and which utilizes three bipolar variable reluctance linear reactors which interface the sphere to the gimbals and thereby react to isotropic forces imposed upon the sphere by fluids flowing therearound.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Before describing in detail the preferred embodiments of the present invention, it is useful to be reminded of the scope and context of the invention. The present invention applies the Bernoulli principle in the presently preferred embodiment because the apparatus and method are the least complicated and also the more sensitive. However, as will be demonstrated, the system is generally more limited in its application to meteorological measurements because the system is more vulnerable to hostile environments.

In contrast, the presently preferred alternative embodiment is an application of the Reynolds principle. While this alternative embodiment will be recognized as generally more complicated, the system is more robust, and can therefore be used in situations where the environment is more hostile, including rain, icing and moderate physical abuse by the elements.

The presently preferred and alternative embodiments are generally described herein as a wind-sphere and a weather-sphere, where the wind-sphere is limited strictly to measurements of wind direction and velocity. On the other hand, the weather-sphere includes additional sensors which provide data for particular meteorological and forecasting techniques which would otherwise require a number of separate traditional devices and disciplines that may or may not be generally related to a net result. These systems are integrated in the weather-sphere to provide a more complete weather monitoring system.

With this introduction to the general principles involved in the operation of the preferred and alternative embodiments, the detailed operations will now be described hereinafter.

Beginning with the presently preferred embodiment, the wind-sphere is actually further divided into a static version and a dynamic version. The first preferred embodiment has no moving parts or openings. This embodiment is best suited for severe weather conditions and/or minimum maintenance requirements.

Figure 1:
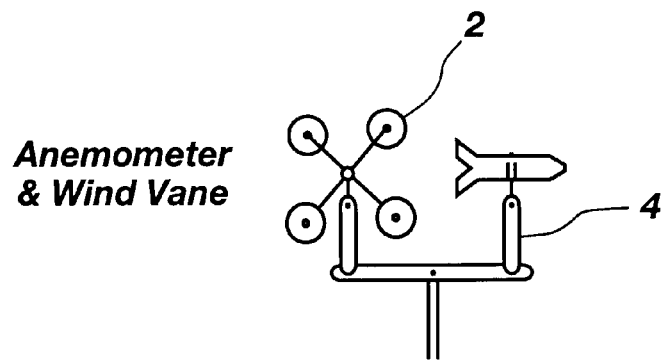
FIG. 1 is an illustration of a simple wind vane and anemometer as taught in the prior art.
Figure 2:
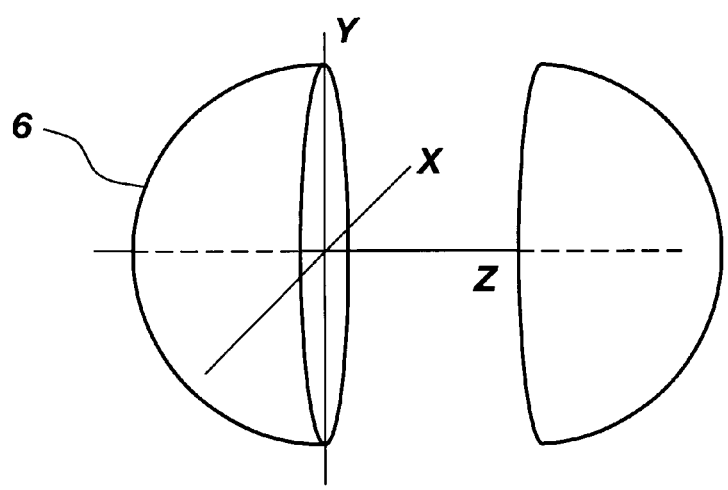
FIG. 2 is a perspective illustration of the three orthogonal axes which the first preferred embodiment establishes for sensor ports and tubes.

FIG. 2 is provided as an illustration of the three orthogonal axes which the first preferred embodiment establishes for sensor ports and tubes. Orthogonality of the axes is important because the calculations used in determining wind velocity and direction require this relationship. FIG. 1 shows an X, Y and Z axis through a cut-away sphere 6. Several observation are relevant at this point. First, it is observed that the sphere 6 does not require any specific orientation relative to the wind or to a mounting or support device. What is important is that the mounting device interfere as little as possible with the flow of air around the sphere. It is also observed that while the embodiments described herein are directed toward the measurement of the velocity and direction of air flow, the invention is capable of determining the flow of any fluid which will flow around the sphere without physically damaging it. Accordingly, the present invention can also function in liquid.

Figure 3:
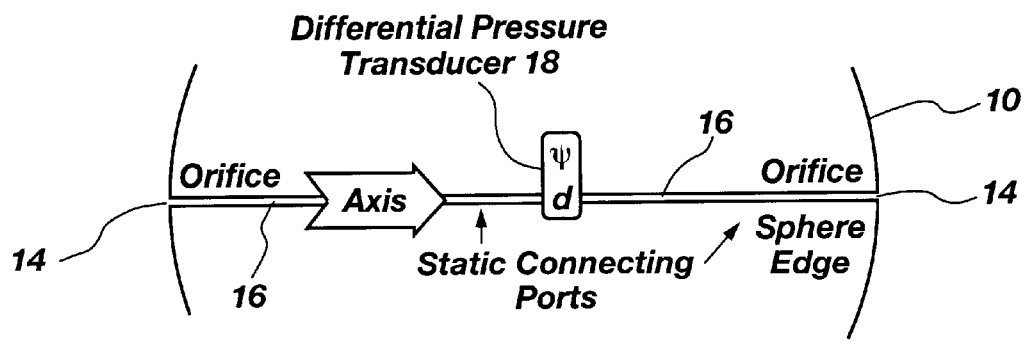
FIG. 3 is a cut-away illustration of the placement of a sensor which is disposed along each of the three axes of the sphere.

FIG. 3 is a cut-away illustration of the placement of a sensor which is disposed along each of the three axes of the sphere 10. Using three orthogonal axes, there are a total of six ports or apertures in the sphere 10. Parallel to each of the three axes is a tube 16 which is coupled to a pair 14 of the six ports. The tube 16 shown in this figure can represent either the X, Y or Z axis. Only one axis is shown at this time to make the illustration clearer.

At some point along the tube 16 is disposed a differential pressure transducer 18. The differential pressure transducer 18 bisects the tubes 16 which are disposed along each of the axes X, Y and Z, preventing the flow of air (or other fluid medium, such as water) therethrough. By measuring a pressure differential at the ports 14, vector algebra is used to determine wind velocity and direction. In other words, isometric (spherical) measurements are determined by applying simple vector algebra.

The differential pressure transducers 18 are used to determine the absolute ambient pressure differentially. From this information, real pressure values are then determined for all quadrants of the sphere 10.

Figure 4:
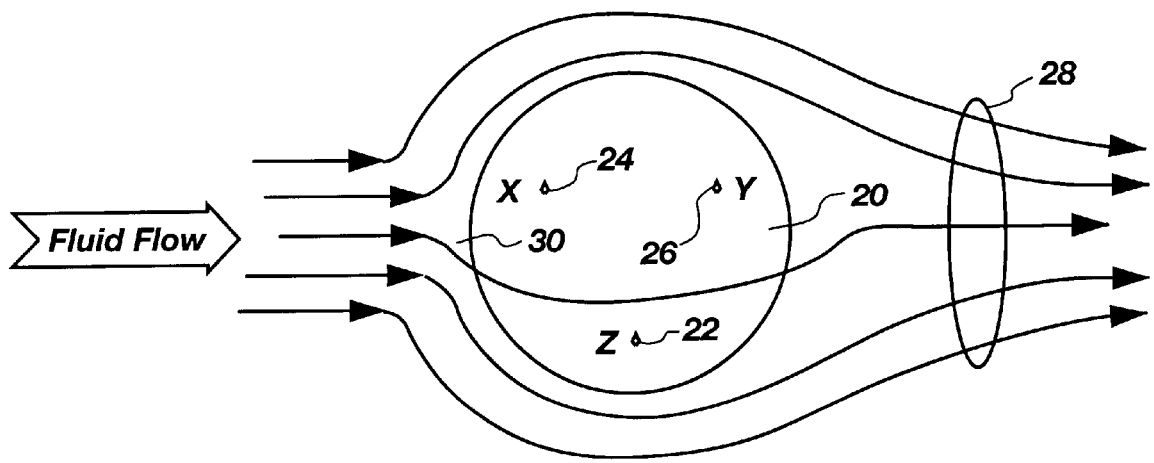
FIG. 4 is a perspective illustration of fluid flow around a sphere 20 which shows one port of each axis tube visible at the same time.

FIG. 4 is an illustration of fluid flow around a sphere 20. FIG. 4 is used to illustrate the concept that by shifting 45 degrees by 45 degrees from a straight orthogonal view, the ports 22, 24, 26 are seen as forming an equilateral triangle having an angle of 120 degrees relative to each of the other ports.

In principle, the first preferred embodiment operates as follows. Fluids flowing towards the sphere 20 are diverted around the sphere in the paths of least resistance, as shown by fluid flow arrows 28. The Bernoulli effect causes pressure differences on opposite sides of the sphere 20 in the axis of the flow. The pressure difference is a function of several properties. These properties include the velocity of the fluid, the viscosity of the fluid, and the angle difference with respect to the ports 22, 24 and 26 in the sphere 20.

In general, fluid flowing over the sphere 20 results in different pressures at different locations on the surface of the sphere. The pressure differentials are measured at the ports 22, 24 and 26 of the sphere 20 and used to determine differential pressure magnitude vectors.

Looking at FIG. 3, it is observed that as fluid flows across the sphere 20, the X and Y axes will measure the greatest pressure difference, with X axis port 24. (shown) having a positive magnitude, and Y axis port 26. (shown) having a negative magnitude. In FIG. 4, Z axis port 22 will generally not measure any pressure difference because the pressures on each side of the Z axis will cancel each other out. This is because the fluid flow is first contacting the sphere 20 at a right angle to the Z axis. In other words, both of the Z axis ports 22 (the one visible and its counterpart on the exact opposite side of the sphere) are approximately one quarter revolution away from a point of first contact 30.

The differential pressure transducers 18 (see FIG. 3) constantly read, in real-time, differential measurements of pressure caused by any fluid dynamics around the sphere. By orienting the three axes orthogonal to each other, a geometric formula is all that is needed to determine the velocity and direction of the fluid from any radial (point on the sphere).

As fluid flows at and then across the surface of the sphere 20, as shown in FIG. 4, areas and points on the surface of the sphere will experience positive or negative pressures. The differential pressure transducers 18 provide bipolar values for the X and the Y axes. From these values, the present invention determines an angular magnitude or vector for the fluid. For this example, this vector will be referred to as longitude vector (r). For the situation shown in FIG. 4, the differential pressure transducers 18 should provide a value of 0.7071 for the X, Y and Z axes (see FIG. 5). Longitude vector (r) is determined according to Equation (1):

$$\vec{r} = \sqrt{X^2 + Y^2} \qquad \text{Equation (1)}$$

Applying equation (1) results in a value for the longitude vector (r) of 1. From this information, the vector magnitude (h) is calculated. In the example of FIG. 3, the Z axis scalar value is also 0.7071, from which it is possible to determine the absolute magnitude vector or "latitude" of the fluid flowing over the sphere.

Figure 5:
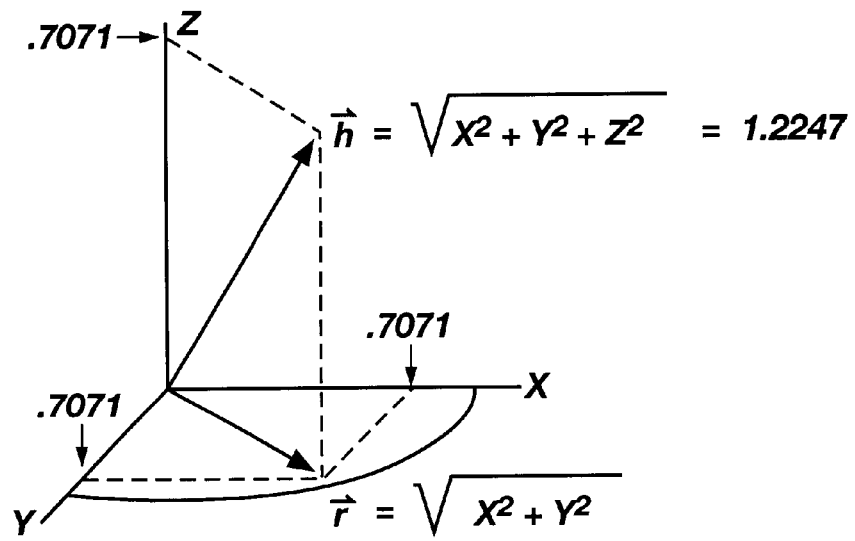
FIG. 5 illustrates the geometrical dynamics of the situation which show how spherical geometry calculations are applied to determine wind velocity.

FIG. 5 illustrates the situation being described above. Equation (2) shows that the vector magnitude (h) is calculated as follows:

$$\vec{h} = \sqrt{X^2 + Y^2 Z^2} \qquad \text{Equation (2)}$$

Applying equation (2) to the example of FIG. 4 results in the vector magnitude (h) being equal to 1.2247.

After determining the "latitude" or vector magnitude, it is necessary to determine the absolute direction of the fluid flow. Absolute direction is determined by calculating øa and øb. This will give a latitude and longitude for the fluid direction from any radial.

Figure 6:
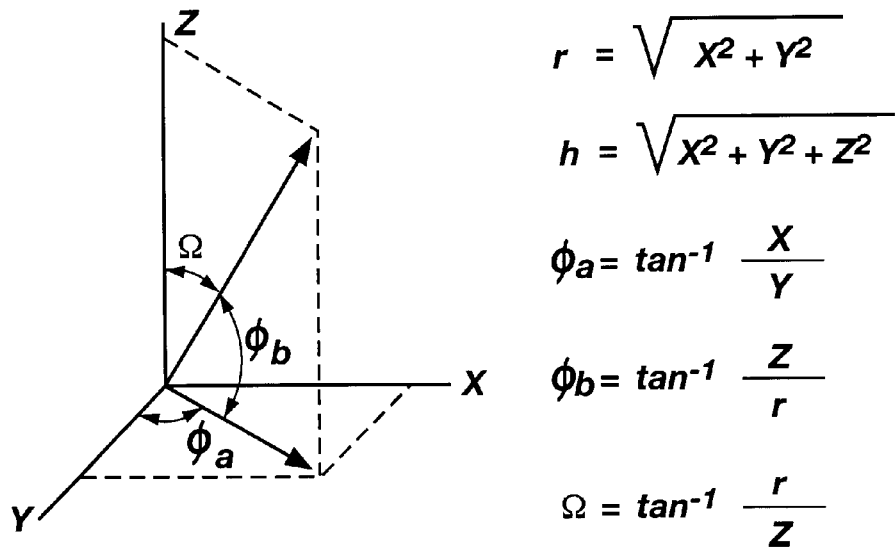
FIG. 6 illustrates the geometrical dynamics of the situation which show how spherical geometry calculations are applied to determine wind direction.

The concept of the point of origin is illustrated in FIG. 6. To help understand this figure, equations (3), (4) and (5) are provided to illustrate the relationships between the vector magnitudes (r) and (h), and the point of origin.

$$\phi a = \tan^{-1}\frac{X}{Y} \quad \text{Equation (3)}$$

$$\phi b = \tan^{-1}\frac{Z}{r} \quad \text{Equation (4)}$$

$$\Omega = \tan^{-1}\frac{r}{Z} \quad \text{Equation (5)}$$

These equations provide a conversion from rectangular to polar coordinates. The magnitude of the vectors (r) and (h) are utilized to calculate the desired angles. The point of origin (radial) from outside the sphere is depicted in a two-dimensional, spherical coordinate system as latitude and longitude in FIG. 6.

In the example given, as the scalar values of the vectors of the three axes become equal with an arbitrary value of the same sign, the latitude (øa) becomes 45 degrees, and the longitude (øb) becomes 54.73 degrees from the top of the sphere. Thus, if the sphere is used in an application to measure wind and is oriented to complement the true axes (longitude and latitude) of the earth, the wind in this example would be coming from the north-east with a downward angle or vertical component of 54.73 degrees. In other words, according to the measurements of the differential pressure transducers, the wind would be blowing down at an angle towards the ground.

In the example given above, the assumption was made that all three differential pressure transducers are measuring a positive scalar value of 0.70711. Using a normalized value derived from the square root of two, it is possible to obtain a normalized number for showing the application of these trigonometric functions. The latitude øa is 45 degrees from the X axis, and the longitude øb is 54.736 degrees referenced from the Z axis.

The absolute speed of the fluid velocity (Fv) is calculated using the same formula as the magnitude for the vector (h). This provides the instantaneous velocity at a given point in time. Thus, (Fv) is also equal to 1.2247.

Figure 7:
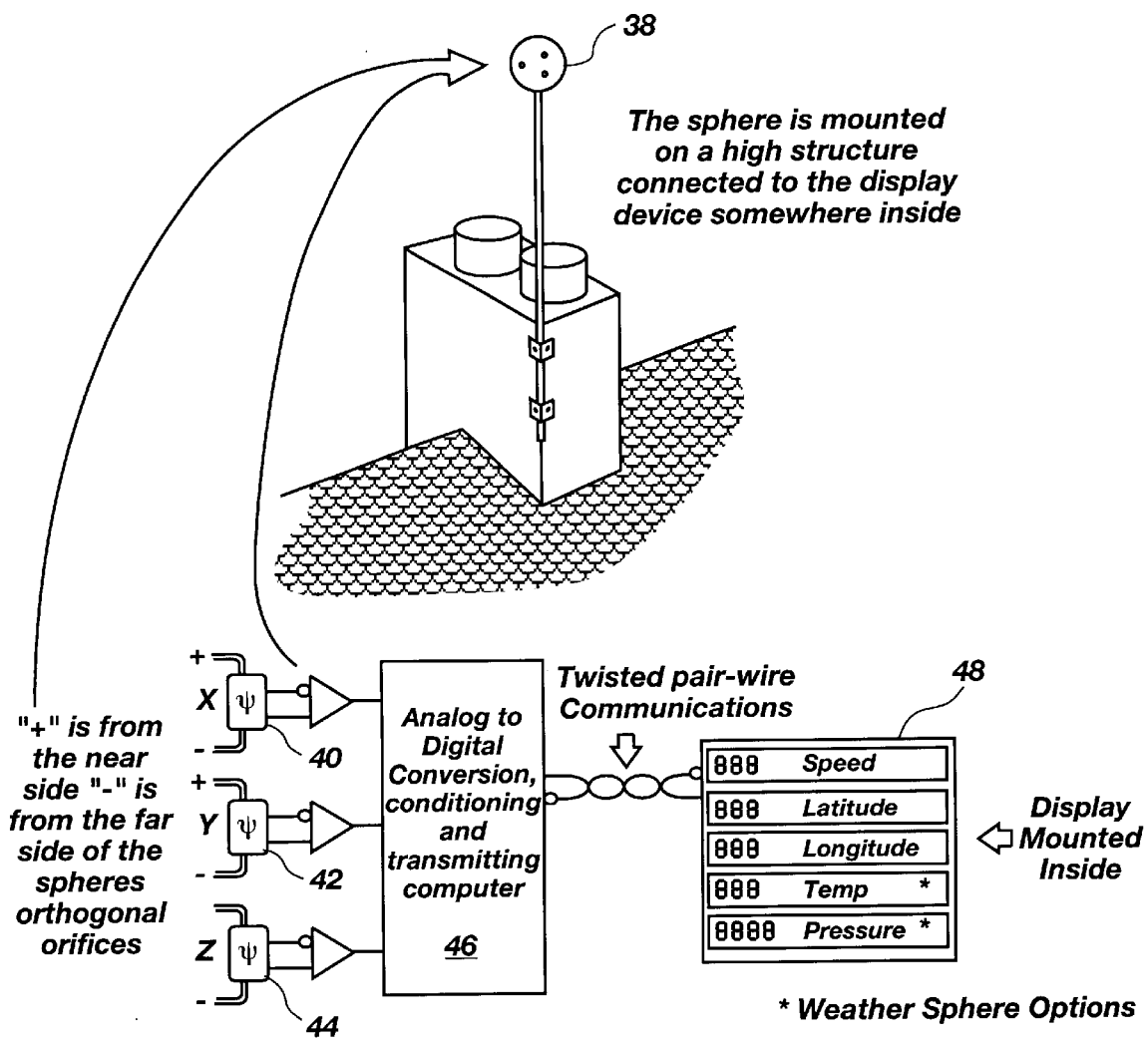
FIG. 7 is an illustration of one possible deployment of the preferred embodiment, where the wind-sphere is disposed on the top of a roof.

It should be mentioned that this first preferred embodiment of the invention, or static method, is most useful for measuring wind velocities from a few to several miles per hour (mph). FIG. 7 is an illustration of a typical application of the wind-sphere or weather-sphere. Because the static wind-sphere is a "weather hardened" wind velocity and direction measurement device, it is relatively unaffected by freezing and severe weather. Accordingly, the wind-sphere is able to replace, with much improved reliability and accuracy, the standard mechanical anemometer and wind vane mechanism used today in most meteorological measurements and forecasting.

FIG. 7 shows that in the preferred embodiment, a small micro-computing device (not shown) is disposed inside the sphere 38 which collects differential pressure data from each of the three transducers 40, 42 and 44. The data is converted from an analog to a digital format in a conversion device 46, and transmits the data to a display device 48 via an appropriate transmission medium, such as by wire or wireless transmission. The display device 48 in this embodiment shows wind speed and direction with respect to the earth's true or magnetic north, as well as the vertical component (moving up or down with respect to the ground) of the wind.

It is noted for contrast that the weather-sphere provides more information than is provided by the wind-sphere. For example, the display can include information such as latitude, longitude, temperature, relative humidity, and absolute and relative barometric pressure. Thus, the weather-sphere is ideal for gathering general meteorological and micro-meteorological information.

Figure 8A:
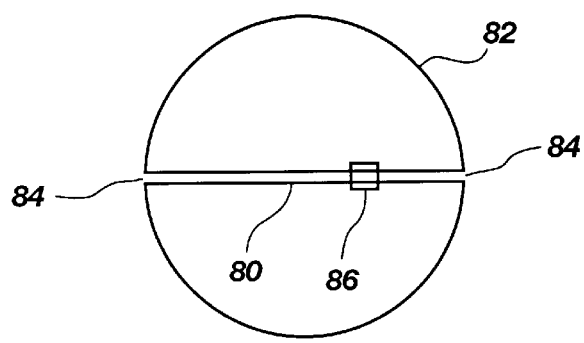
FIG. 8A illustrates in a cut-away view of a sphere an axis tube which is used to measure the movement of fluid flow instead of differential pressures.

FIG. 8A illustrates an alternative preferred embodiment of the invention. The figures shows a dynamic wind direction and velocity determination device. The dynamic method of this alternative embodiment utilizes fluid flow through the tubes 80 that are disposed along the axes of the sphere 82. In this figure, only one tube 80 is shown for visual clarity. Reliance on fluid flow, however, renders the dynamic method more vulnerable to the elements. This is because the dynamic method does not rely on a large volume of fluid flow. Accordingly, even small obstructions to the free flow of fluid can drastically skew the measurements and the corresponding results. Thus, ice or other debris that becomes lodged in the ports 84 of the tubes 80 can have very detrimental effects on performance. Therefore, the dynamic method of the invention is generally suitable for specialized applications where the ports of the weather-sphere 82 are not easily clogged.

Nevertheless, the dynamic method is also more sensitive because of the nature of the device. Specifically, very small wind movement is not going to generate significant pressure differentials on the surfaces of the sphere as the wind passes around it. This, of course, is the principle on which the first preferred embodiment operates. In other words, the principle of operation is based upon an indirect measurement. The detectable phenomenon, unfortunately, is generally not going to be easily detectable because the effect is so negligible at small wind velocities.

In contrast, however, relatively minute wind movement is directly detectable and measurable by the invention. The first alternative preferred embodiment makes direct measurements of the flow of a fluid (in this case air) as it passes through the tubes 80 in the sphere. FIG. 8A shows a sensor 86 which allows movement of air through the tube 80 as it measures a rate of air flow.

While this alternative embodiment has the distinct advantage of being able to directly measure air flow using a sensor, it is important to realize that it is most likely that these embodiment will be used for different types of applications. For example, a user who is interested in detecting very slow fluid movements is probably less likely to be interested in larger "gross" movements of the fluid, and vice versa.

The measurements of air movement through the tubes 80. which are disposed along the three orthogonal axes of the sphere 82 are used to determine wind velocity and direction in the exact same manner as in the first preferred embodiment. Those skilled in the art will now recognize that the same equations can be applied to the measured values to determine the desired values.

It is noted that there is some calibration required when using the alternative embodiment of the invention as described above. Specifically, the movement of air through the sphere must be monitored to set a "baseline" for normal operation. These baseline values are based on the range of air movement velocities which occur in the tubes of the sphere when the air flow is at a maximum velocity and a minimum velocity. Maximum velocity occurs when the direction of the air flow is straight into a tube port 84, and minimum velocity occurs when air flow is at a right angle with respect to a tube port.

It should now be apparent that the calibration of the alternative embodiment is thrown off when an obstruction impedes air flow through the tubes 80. For example, when air flow should be at a maximum when it is directly into a tube port, the velocity will appear as less than its calibrated maximum value would indicate, thus giving the false impression that the air flow is not directly into the tube port 84.

Figure 8B:
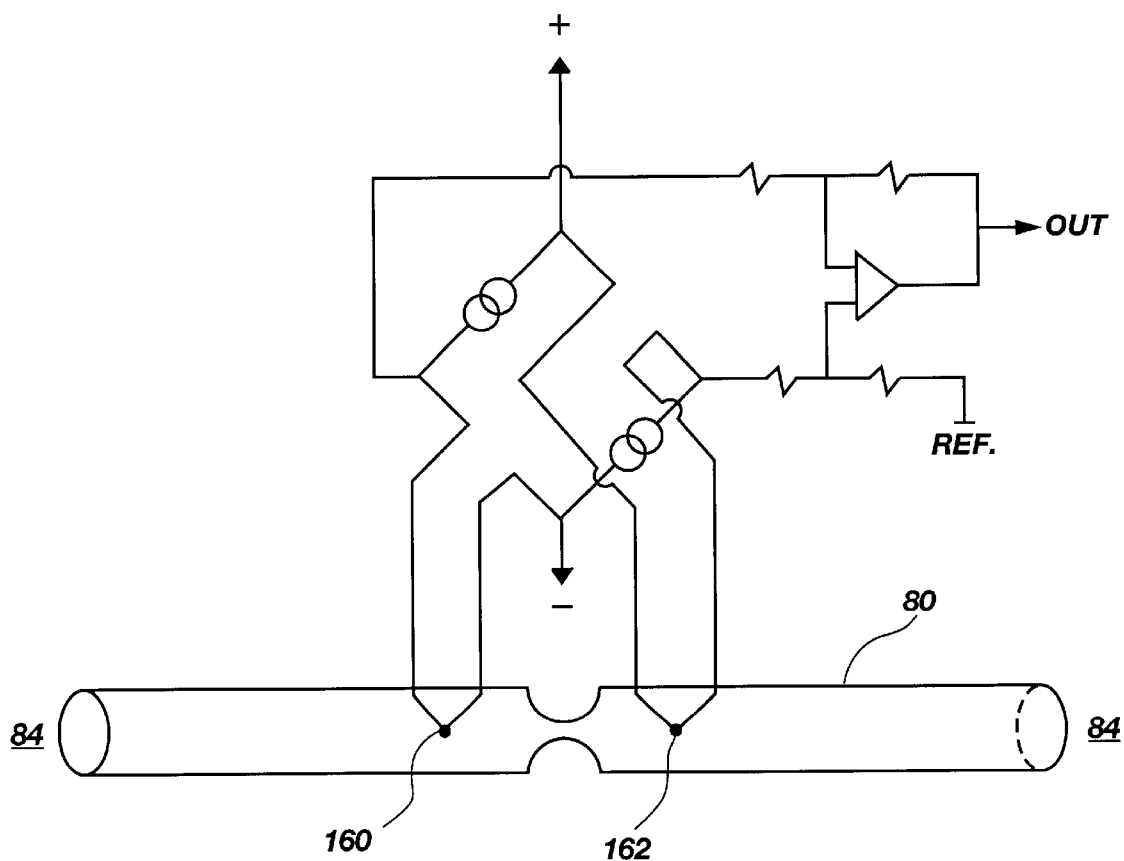
FIG. 8B is a circuit schematic diagram which illustrates a thermistor bridge which can be used to measure fluid flow through a tube in the sphere.

FIG. 8B is provided as one example of a circuit which can be used as sensor 86 shown in FIG. 8A. This circuit utilizes thermistors to measure fluid slow. Consider a first thermistor 160 and a second thermistor 162 in a bridge circuit. The thermistors 160, 162 are disposed in the tube 80. The tube 80 is also shown having a pinched portion which further restricts airflow to a narrow channel.

Alternatively, another type of fluid flow sensor that can substituted for the circuit shown in FIG. 8B is a hot-wire method. However, as known to those skilled in the art, this method requires that the type of fluid being measured must be known.

A second alternative embodiment is based on the Reynold's principle. The Reynold's principle utilizes a sphere with no ports. However, instead of taking indirect measurements (differential pressures on opposite sides of the sphere), direct measurements are taken using mechanical devices. Thus, this alternative embodiment can be exposed to severe weather conditions because there are no ports to become obstructed.

Figure 9A:
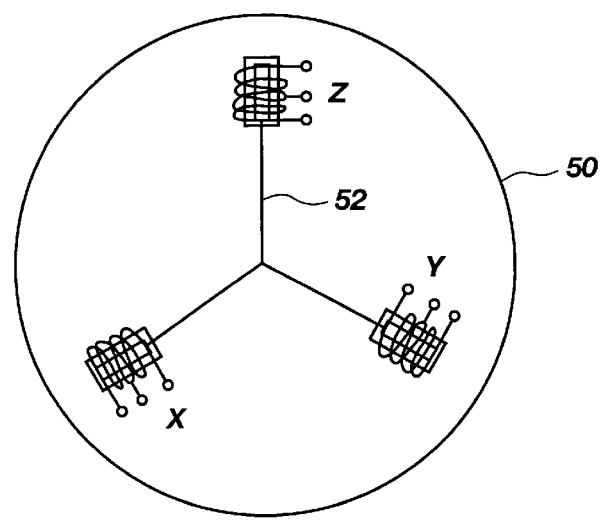
FIG. 9A illustrates in a top view of a sphere another alternative embodiment of the present invention which shows the sphere having a gimbal system mounted therein which utilizes variable reluctance/reactance to measure wind flow.

FIG. 9A illustrates the principles of this second alternative embodiment. FIG. 9A is a top view of the inside of a sphere 50. Inside the sphere 50 is a gimbal 52 which has three orthogonally mounted bipolar variable reluctance/reactance linear reactors or sensors, 54, 56 and 58. The current measured from these sensors is representative of an amount of the applied force. The measured current is directly proportional to the velocity of the moving fluid. This second alternative embodiment also requires calibration of the device so that electrical current values can be corresponded to an appropriate force and thus velocity of the wind, and is understood by those skilled in the art.

Figure 9B:
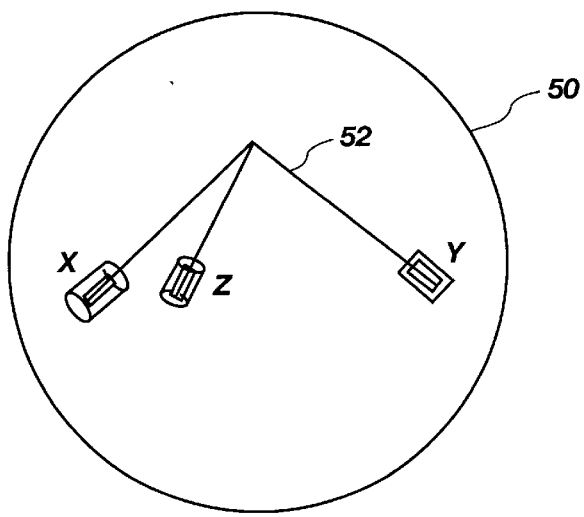
FIG. 9B is a side view of the sphere and gimbal sensing system shown in FIG. 9A.

FIG. 9B is a view inside of the sphere 50 so as to show the gimbal 52. The orthogonal ends of the gimbal 52 are labeled as the X, Y and Z axis. The wire wrapping around the ends of the variable reluctance/reactance sensors has been left out of the diagram.

Figure 9C:
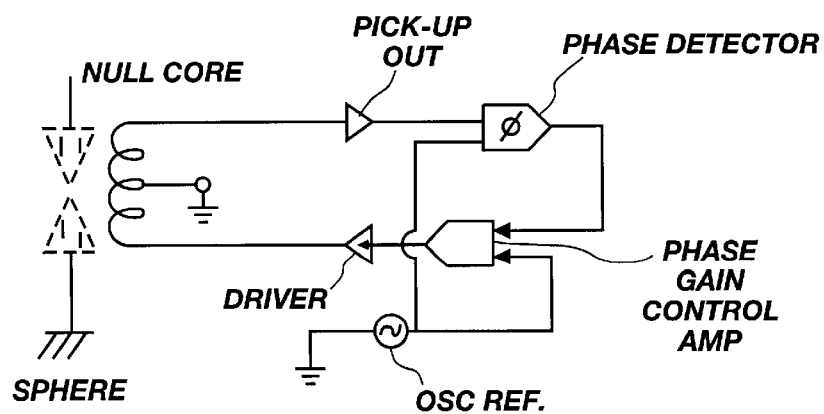
FIG. 9C is a circuit schematic diagram of one possible implementation of a variable reluctance/reactance sensor used in the gimbal of FIGS. 9A and 9B.

FIG. 9C is a detailed schematic of one possible configuration of a variable reluctance/reactance sensor. Those skilled in the art are familiar with such a circuit and can implement as described in FIGS. 9A and 9B.

Figure 10:
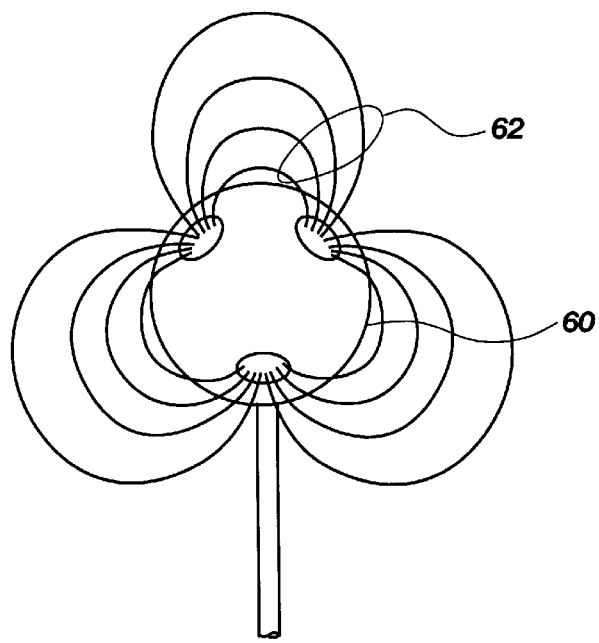
FIG. 10 is an illustration of another alternative embodiment which utilizes the principle of E-fields being used to detect different dielectrics of the fluid that are formed when air passes around the sphere.

FIG. 10 illustrates a third alternative embodiment of the invention. This embodiment is also an application of a static method which does not require ports in the sphere. In this embodiment, electrical fields (E-fields) are projected orthogonally about a sphere 60 and the dielectric constant of the air is measured. It has been determined that zones of higher pressure about the sphere have higher dielectrics than zones of lower pressure.

In this embodiment, the system which is generating the E-fields is multi-plexed in three orthogonal fields about selected orthogonal axes. The E-fields are rapidly generated in each of the three zones, and the dielectrics measured. In this way, an E-field generated (and measurement made) in one axis does not interfere with the E-field generated (and measurement made) in a different axis.

FIG. 10 illustrates, in a very simplified manner, that the sphere 60 emits E-fields from six orthogonally placed plates.

The E-fields are shown as flux lines 62 For this figure, the E-field flux lines 62 are shown interacting between three of the six plates which are visible on a single side of the sphere 60.

It is observed that each of the embodiments described above can be used in a wind-sphere mode of operation. That is to say, each of the embodiments can function solely to determine a velocity and direction of a fluid. Typically, the fluid is going to be wind. It is desirable to describe applications of the wind-sphere which can take advantage of the characteristics of the embodiments described above.

One of the most beneficial applications to which the wind-sphere is applied is in the detection of dangerous wind conditions in and around an airport. The dangers of wind shear are now well documented. These so-called dry microbursts are considered the most dangerous condition for aircraft in the take-off and landing phase. This is because the down-pouring wind has little or no visible clues which indicate its presence. It is observed that 90% of the commercial airplane accidents, where wind-shear and/or microbursts were suspected or determined to be the cause, have happened during the low altitude final approach phase of a flight. This particular phenomena is reliably and inexpensively detectable by the present invention, as will be explained.

Figure 11:
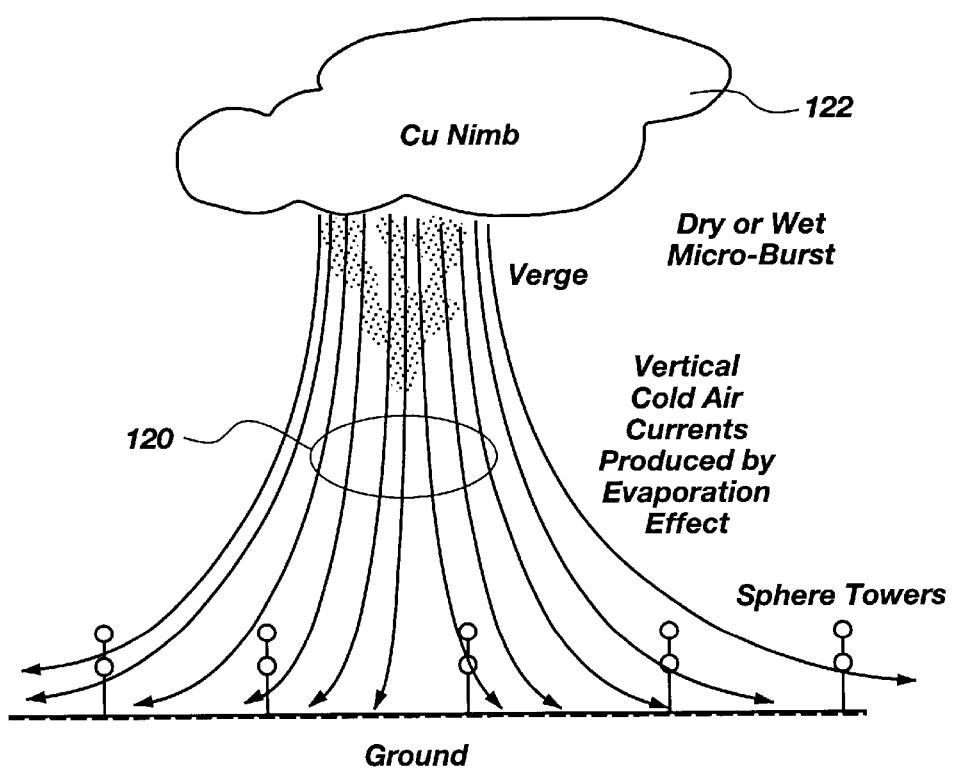
FIG. 11 is an illustration of the formation of micro-bursts or wind shear weather conditions which a networked version of the present invention is able to detect when deployed as an array of linked stations.

FIG. 11 illustrates that the micro-burst is typically a channel of cool air 120 produced by rain that rapidly evaporates shortly after it pours down from a cumulonimbus cloud 122 as shown in FIG. 10. This column of dense cool air 120 channels down towards the ground at moderate to high speeds (such as 40 to 60 mph). As the column of air 120 hits ground level, it fans out in all directions, moving at faster speeds (typical gusts up to 100 mph). In many cases, the air speed difference is sufficient to cause a large aircraft to stall and crash as it passes from an into-the-wind to a down-wind condition.

The present invention is deployed in such a manner that enables detection of the micro-burst or wind-shear condition. This is possible by deploying a plurality of wind-spheres in a network.

Figure 12:
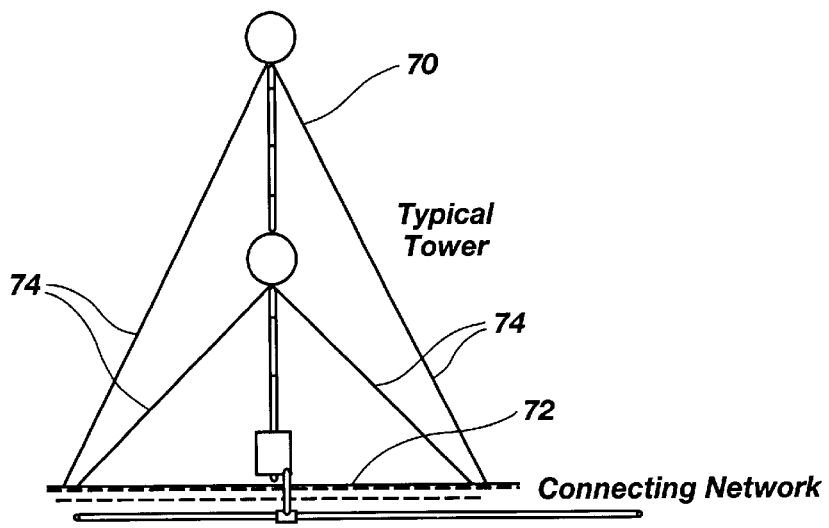
FIG. 12 is an elevational view of a typical wind or weather-sphere tower which is anchored to the ground, and coupled to a data collection device via a network protocol.

FIG. 12 is provided as an illustration of a single wind-sphere or weather-sphere "tower". The tower 70 is anchored to the ground 72 using cables 74 to enable it to withstand high wind velocities. The towers 70 are connected to a computing station which receives data from each of the towers 70 in the network, and processes the data. Thus, the towers 70 operate to passively detect dangerous wind conditions, without the use of LIDAR or RADAR. The data can also be graphically displayed for rapid assimilation by air traffic controllers. Typically these towers are not mounted higher than runway lights, or approximately 2 feet in height. However, the height of the towers can be adjusted up or down.

Figure 13:
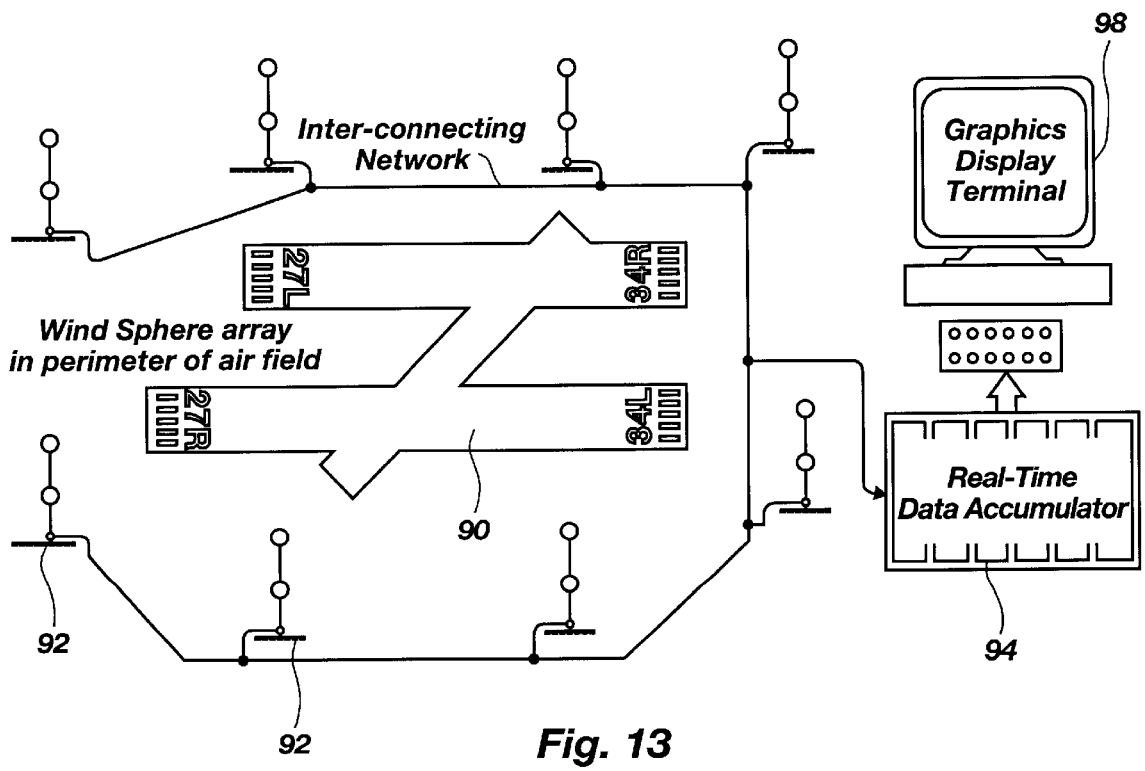
FIG. 13 is a top view of a simplified example of an airfield with towers disposed around it in a sensing array.

FIG. 13 is provided as an illustration of this wind shear application of the wind-sphere invention. This figures is a bird's eye view of some airport runways 90. Surrounding the runways 90 are a plurality of wind-sphere towers 92. The towers 92 are shown as being electrically coupled to a real-time data accumulation system 94. The system 94 received the real-time data and generates a three dimensional image on a graphical display 98 of the winds surrounding the airport runways 90.

It is important to realize that the wind-sphere towers 92 are not directly measuring the wind velocity and direction in all locations above and around the runways 90. Instead, the information from the array of towers 92. is used to extrapolate a three-dimensional image of the wind patterns in areas that are not directly measured.

Figure 14A:
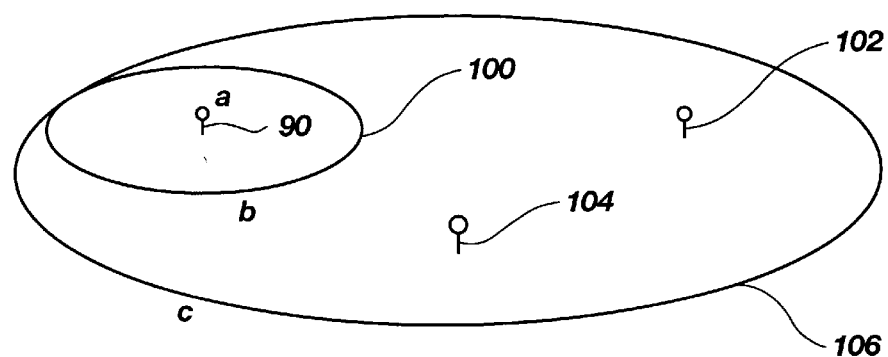
FIG. 14A illustrates the concept of being able to join towers in an array so as to extrapolate information for an area which is larger than the individual towers.

For example, consider FIG. 14A. The real-time data from one tower 90 is shown as roughly encompassing an area 100 which is generally a circular area around the tower. It should also be evident that the area of coverage is not just circular, but extends upwards to form a dome or domes. When towers 102 and 104 are added to the system, it is now possible to extrapolate information for a much larger area than is actually being measured, as represented by area 106.

Figure 14B:
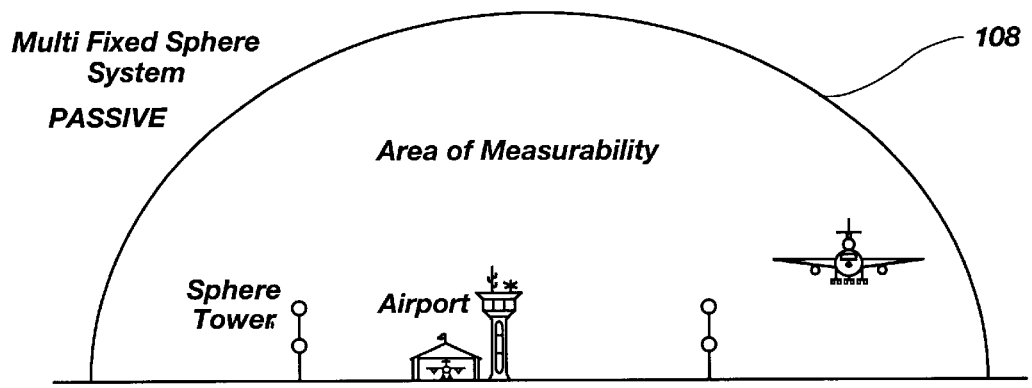
FIG. 14B shows in a cross-sectional view the bubble or dome of coverage represented by FIG. 14A.

FIG. 14B is provided as a more complete illustration of the concept of FIG. 14A. Specifically, the area of detection and extrapolation is actually better described as a bubble or dome 108 around wind-sphere towers.

Figure 14C:
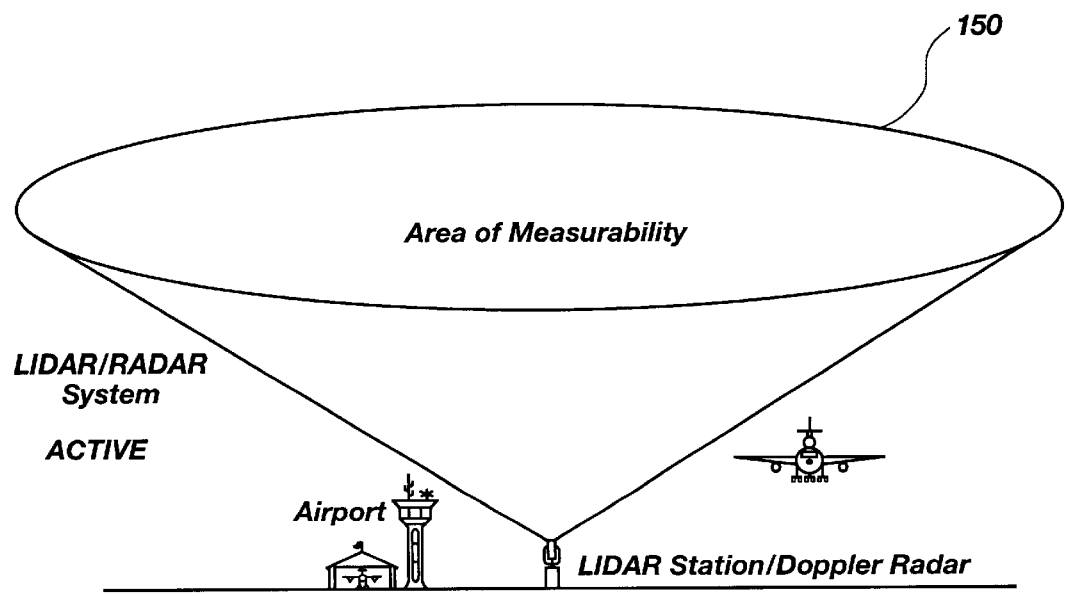
FIG. 14C is a perspective view of the area of coverage as provided by the prior art active LIDAR and RADAR systems.

It is noted in contrast that in FIG. 14C, the generally effective coverage of a LIDAR/RADAR active sensor system is shown as the inverted cone 150.

Figure 15:
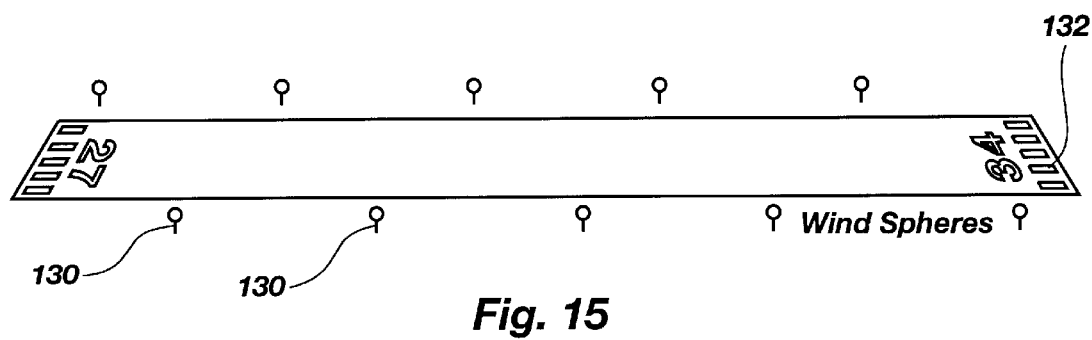
FIG. 15 illustrates in a perspective view an array of towers which are deployed to detect dangerous vortices and other wind phenomenon that are generated by an aircraft itself.

The actual numbers of towers deployed in an array would depend upon several factors. These factors include the desired accuracy of the system, and the resolution of the system. It is expected that a system yielding a high resolution image would likely consist of a tower 130 disposed every 500 feet and staggered from side-to-side along an airstrip 132 as shown in FIG. 15. In a situation such as the one shown, the graphical display could show actual air movements in three dimensions, or provide a simpler Go/No-Go signal for air traffic controllers.

It has been explained that an array of wind-sphere towers can detect dangerous wind conditions such as micro-burst or wind shear. It is also possible for an array of towers to detect other dangerous wind conditions. These conditions include winds caused by the aircraft themselves, such as wing tip vortices, jet exhaust, and prop wash.

It is also envisioned that the graphical display would be able to provide a view of the extrapolated and measured winds from any desired angle. For example, it may be desirable to view the wind from the perspective of the runway, from in the air, or even from the perspective of the aircraft cockpit.

In addition to measuring wind movement, the wind-spheres in the towers can be replaced with weather-spheres. Weather-spheres enable the system to detect other meteorological information which can also be used in the detection of dangerous wind conditions. This additional information can include absolute pressure, temperature and relative humidity. Pressure waves (ranging from micro-bars to bars) are detected to facilitate dry micro-burst detection. Temperature and humidity waves can also be detected. For example, many dry micro-bursts are associated with a small, cool, dry air mass that moves out in an iso-planar wave from an initial contact point with the earth. It is possible to detect the micro-burst via its pressure wave and radial wind signature.

Another condition which is common to airfields os laminar or horizontal wind shear. This condition is also referred to as a vertical convergence. This is where two prevailing winds (usually of differing temperatures) come together by deflecting each other upwards.

Figure 16:
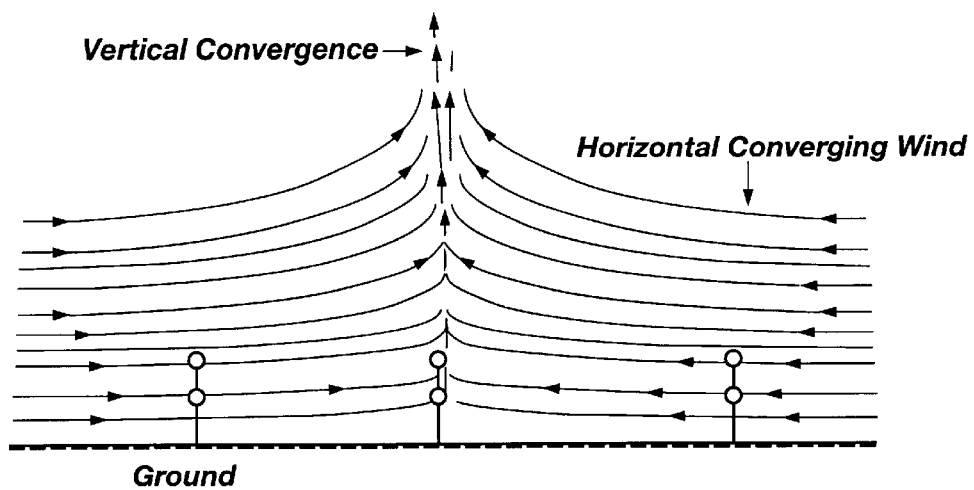
FIG. 16 is an illustration of the weather conditions present in a vertical convergence.

This vertical convergence is illustrated in FIG. 16. Although not as dangerous of a condition, a vertical convergence can provide information of the location of microfronts or squall fronts that are typically a precursor to large dust devils that can be dangerous to aircraft.

An array of weather-spheres provides the most operational and cost effective means for detecting most micro-meteorological phenomena that existing wind detection systems are inadequate or incapable of detecting.

Figure 17:
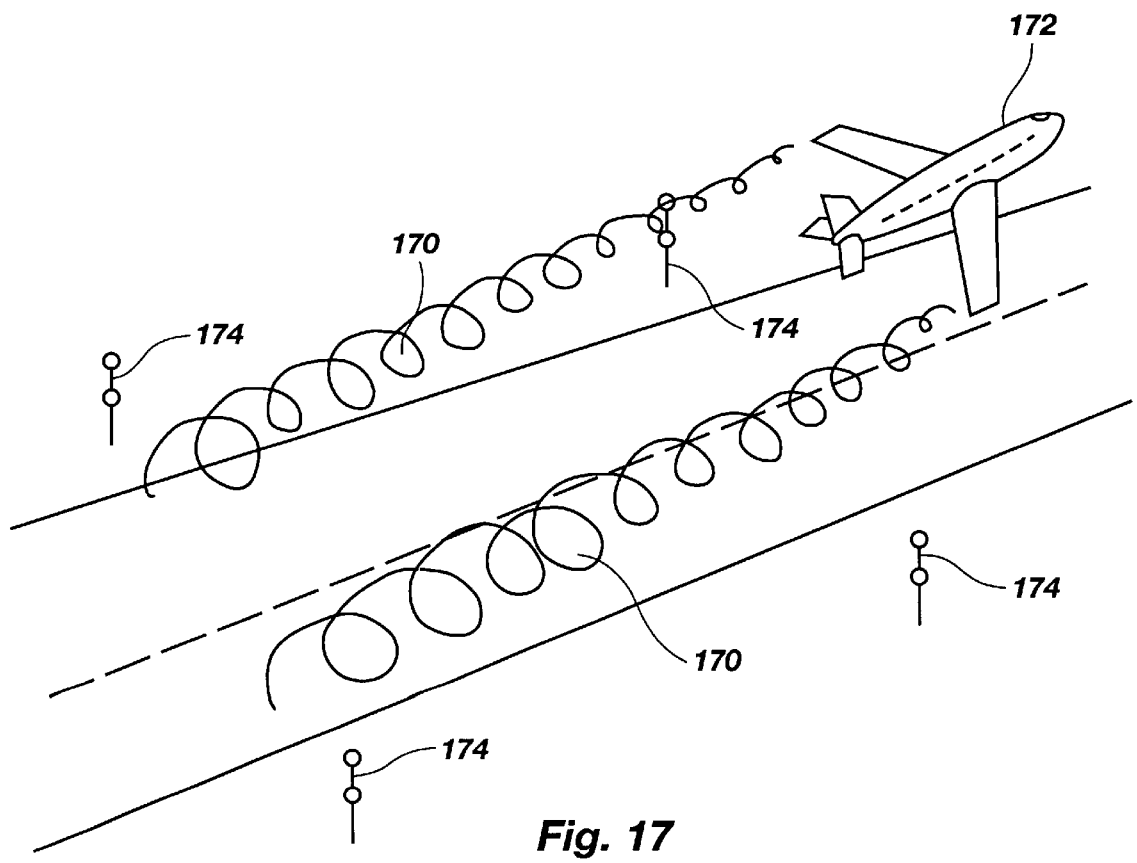
FIG. 17 is an illustration of a small wind or weather-sphere array applied to a high volume fluid pipeline.
Figure 18:
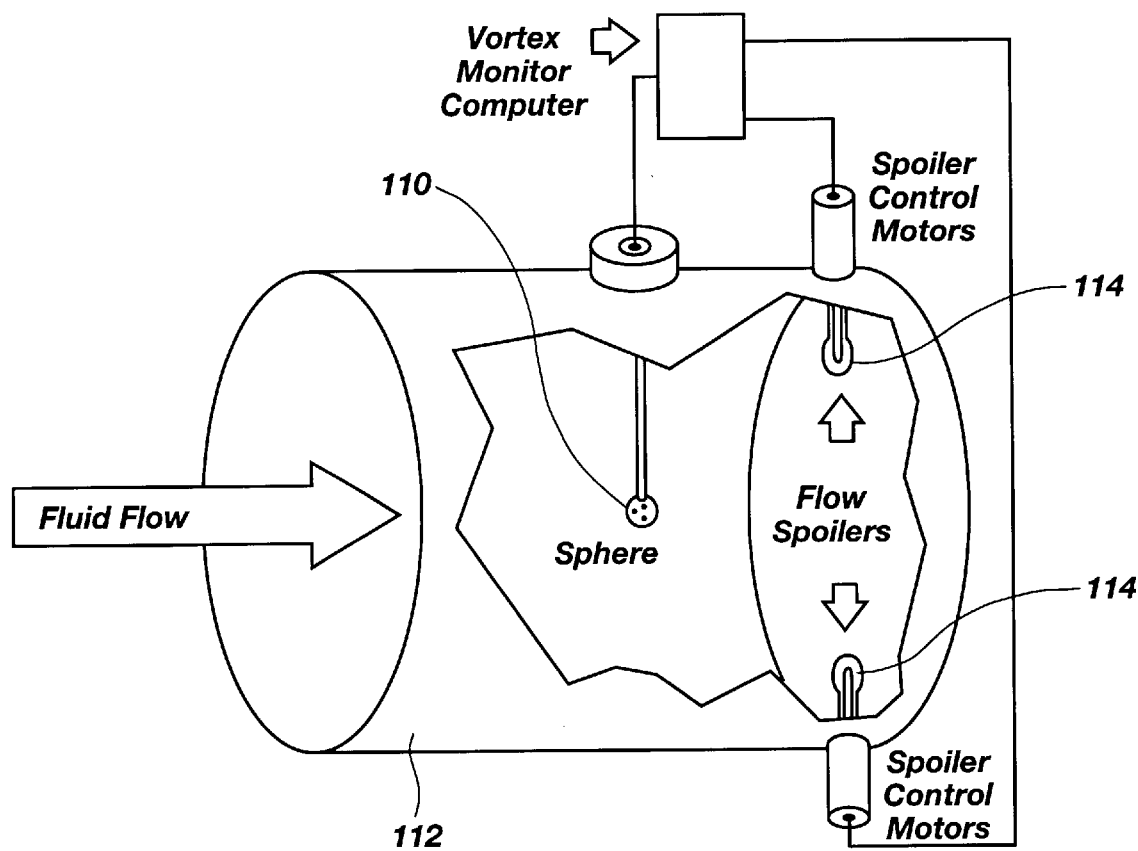
FIG. 18 is an illustration of an application of a "wind-sphere" which is disposed in a pipe which has a liquid flowing therethrough.

FIG. 17 is an illustration of a smaller and shorter wind or weather-sphere array 174 placed in close proximity to an airstrip. Such an array can detect wind vortices 170 that are generated by large aircraft 172 that are taking off. This condition has caused planes to crash. The condition is controlled by spacing aircraft far enough apart to avoid the vortices. Nevertheless, the vortices can be very unpredictable, and can still affect an airplane that is miles behind another.

While application of the present invention to dangerous wind detection at airfields is important, there are other applications of fluid velocity and direction determination. For example, high volume pipelines carrying fluids need an inexpensive and reliable method of vortex detection. Fluids transported via high volume pipelines will tend to spin (vortex) about the circumference of the pipe line. The effect of a vortex is to decrease the speed of the fluid through the pipeline, thereby reducing efficiency. Efficiency can be reduced to the point that the amount of energy required to propel the fluid the pipeline to its destination becomes prohibitively large.

Adding to the difficulty is the fact that the vortex may not be constant. For example, temperature, barometric pressure and humidity can change the viscosity and flow properties of the fluid. The fluid may even flow at one temperature, and vortex at another. This action causes a pumping station to use more energy to move the same volume of media of at one temperature than at another.

Some pumping systems include valve-like devices which add a counter spin to the fluid in order to compensate and essentially cancel out the vortex. Disadvantageously, however, the devices may need to be changed several times over a 24 hour period to compensate for temperature and pressure changes.

FIG. 17 illustrates an application of the present invention to the pipeline situation described above. The application entails disposing a vortex sensing sphere 110. inside a pipeline 112 at various strategic locations in the system in order to monitor vortexing. The present invention provides feedback to a system which is able to automatically adjust flow-spoiler fins 114 which are inserted into the fluid flow to adjust the direction of spin, and thus cancel out a vortex. This is accomplished by placing the vortex sensing sphere 110 up stream from the spoiler fins 114. The vortex sensing sphere 110 monitors the back flow impedance of the fluid to obtain a reflected reading of the total influence of the vortex down the pipeline 112. The present invention can reduce energy costs in propelling of the fluid in large volume transportation situations.

It is most likely that a static wind-sphere would be used as the vortex-sensing sphere 110 because the speed of the fluid is probably large, and the sphere would require less maintenance. However, the dynamic wind-sphere design could also be used if the vortexes can appear at relatively small velocities of the fluid.

Another useful application of the wind and weather-sphere technology of the present invention is in aviation and aerospace applications. Specifically, the present invention is useful for measuring the angle-of-attack and airspeed of an aircraft. This would enable an auto-pilot system to have positive attitude feedback and control of the pitch of the aircraft. It is noted that standard auto-pilot systems in use today do not have a direct measurement of this feature.

Another application of the present invention is in medical devices. More specifically, in a cardiovascular application, a very small version of the sphere can be inserted via cardiac catheterization into an artery that feeds into chambers of the heart. From this location, blood flow patterns, volume, velocity, and absolute and relative pressures can be monitored in real-time. The present invention could therefore have very practical diagnosis advantages over more conventional nuclear medical methods.

Another application of the technology is in respiratory diagnosis. A conventional method of monitoring distributive ventilation is where a patient inhales air with a radioactive tracer disposed therein. The distribution of the irradiated air is then observed by means of a complex atomic scintillation imaging camera. This system is replaced by the present invention by inserting a small sphere down the trachea and into the bronchi where distributive ventilation can be directly measured for the lungs.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system for measuring a direction and velocity of fluid flow in three-dimensions, said system comprising:
   a sphere which is disposed so as to allow generally free movement of a fluid around the sphere, and including three orthogonally located apertures which pass completely through the sphere and which generally intersect at a center thereof,
   a plurality of differential pressure sensors, wherein one is disposed in each of the three orthogonally located apertures for determining a pressure at opposite ends thereof; and
   a calculating device which receives information from the plurality of differential pressure sensors and calculates the direction and velocity of the fluid.

2. The system as defined in claim 1 wherein the system further comprises a support system for rigidly holding the sphere in a predetermined position.

3. The system as defined in claim 2 wherein the support system is comprised of a pole which is coupled to the sphere at a base thereof, wherein the pole is disposed at a location which enables the generally unobstructed movement of air flow around the sphere.

4. The system as defined in claim 1 wherein each of the differential pressure transducers prevents movement of the fluid through the three orthogonally located apertures.

5. The system as defined in claim 1 wherein the system further comprises:
   a plurality of spheres which are disposed in a localized area; and
   a central processing unit for receiving air flow data from each of the plurality of spheres, and for generating information regarding wind direction and velocity in the localized area.

6. The system as defined in claim 5 wherein the system further comprises a plurality of spheres which are disposed along both sides of a runway to thereby generate data including information regarding turbulence generated by an aircraft that is taking-off or landing.

7. A system for measuring a direction and velocity of fluid flow in three-dimensions, said system comprising:
   a sphere which is disposed so as to allow generally free movement of a fluid around the sphere, and including three orthogonally located apertures which pass completely through the sphere and which generally intersect at a center thereof,
   a plurality of sensors, wherein one of the plurality of sensors is disposed in each of the three orthogonally located apertures, wherein the plurality of sensors determine a rate of fluid flow through each of the three orthogonally located apertures; and
   a calculating device which receives information from the plurality of sensors and calculates the direction and velocity of the fluid.

8. The system as defined in claim 7 wherein the plurality of sensors are further comprised of thermistor bridges for measuring fluid flow through each of the three orthogonally located apertures, and to thereby dynamically generate information regarding the direction and velocity of the fluid.

9. A system for measuring a direction and velocity of fluid flow in three-dimensions, said system comprising:
   a sphere which is disposed so as to allow generally free movement of a fluid around the sphere;
   a first aperture disposed completely through the sphere and forming a first tube which is disposed through a center thereof, wherein the first aperture includes a first differential pressure sensor;
   a second aperture disposed completely through the sphere and forming a second tube which is disposed through the center thereof and orthogonal to the first aperture, wherein the second aperture includes a second differential pressure sensor;
   a third aperture disposed completely through the sphere and forming a third tube which is disposed through the center thereof and orthogonal to the first aperture and the second aperture, wherein the third aperture includes a third differential pressure sensor; and
   a calculating device which receives information from the first, second and third differential pressure sensors and calculates the direction and velocity of the fluid.

10. A method for measuring a direction and velocity of fluid flow in three-dimensions by using a fluid flow measurement system, said method comprising the steps of:
    (1) providing a sphere which is disposed so as to allow generally unobstructed movement of a fluid around the sphere, including three orthogonally located apertures which pass completely through the sphere and which generally intersect at a center thereof, a plurality of differential pressure sensors, wherein one is disposed in each of the three orthogonally located apertures so as to block movement of fluid therethrough, and a calculating device which receives information from the differential pressure sensors; and
    (2) statically determining the direction and velocity of fluid flow around the sphere by measuring a pressure differential on opposite ends of each of the plurality of differential pressure sensors.

11. The method as defined in claim 10 wherein the method further comprises the step of building the fluid flow measurement system without moving parts to thereby reduce maintenance costs and increase reliability thereof.

12. The method as defined in claim 10 wherein the method further comprises the step of building the fluid flow measurement system so as not to require fluid flow through the system in order to conduct the fluid flow measurements.

13. The method as defined in claim 10 wherein the method further comprises the step of utilizing the fluid flow measurement system in harsh environments which would otherwise interfere with a system having moving parts or require the flow of fluid through an orifice.

14. The method as defined in claim 10 wherein the method further comprises the step of determining the direction and velocity of fluid flow by applying vector algebra equations to the pressure differential measurements generated by the plurality of differential pressure transducers.

15. The method as defined in claim 14 wherein the step of applying vector algebra further comprises the steps of:
   (1) measuring bipolar values of differential pressures for an X axis and a Y axis;
   (2) determining a vector magnitude of the fluid flow; and
   (3) determining an absolute direction of fluid flow by calculating øa and øb which are used to determine a latitude and a longitude for the absolute direction of fluid flow from any radial.

16. The method as defined in claim 10 wherein the method further comprises the steps of:
   (1) providing a plurality of the spheres in a vicinity of an airport runway;
   (2) networking the plurality of spheres to a central information processing center to thereby receive the statically determined fluid flow information from the plurality of spheres; and
   (3) extrapolating information regarding air flow movement in the vicinity of the airport runway for an area larger than that which is directly measurable by the plurality of spheres.

17. The method as defined in claim 16 wherein the method further comprises the step of utilizing the network of fluid flow measurement systems to detect wind shear, wing tip vortices and other dangerous air movement phenomena which pose a threat to aircraft.

18. The method as defined in claim 10 wherein the method further comprises the step of measuring the direction and velocity of fluid flow for a fluid which is moving at a velocity which is greater than 1 mile per hour.

19. The method as defined in claim 10 wherein the method further comprises utilizing the fluid flow measurement system to detect a vortex or a standing wave in a pipeline through which a liquid travels, said method comprising the step of inserting a vortex sensing sphere into approximately a center of the pipeline, wherein the sphere is coupled to an insertion rod which positions the sphere in the pipeline, and which serves as a conduit for the fluid flow information.

20. The method as defined in claim 19 wherein the method further comprises the steps of:
   (1) inserting a flow-spoiler fin assembly into the pipeline in a vicinity of the vortex sensing sphere; and
   (2) adjusting a plurality of fins of the flow-spoiler fin assembly to thereby counteract and diminish the vortex or the standing wave, to thereby enable the fluid to flow through the pipeline without having to apply as great a pumping force.

21. The method as defined in claim 20 wherein the method further comprises the step of utilizing the vortex sensing sphere and the flow-spoiler fin assembly to reduce the energy required to propel the fluid through the pipeline.

22. The method as defined in claim 10 wherein the method further comprises utilizing the fluid flow measurement system to directly measure an angle-of-attack of an aircraft, said method comprising the steps of:
   (1) disposing the sphere on the aircraft such that it receives generally unobstructed airflow around the sphere;
   (2) determining the angle-of-attack of the aircraft; and
   (3) transmitting the angle-of-attack to a computer in the aircraft.

23. The method as defined in claim 22 wherein the method further comprises the step of utilizing the angle-of-attack to thereby better control flight controls of the aircraft.

24. The method as defined in claim 23 wherein the method further comprises the step of controlling a pitch and a skid of the aircraft.

25. The method as defined in claim 10 wherein the method further comprises utilizing the fluid flow measurement system to detect the velocity and direction of blood within a vein or artery, said method comprising the step of inserting a fluid flow sensing sphere into approximately a center of the vein or artery, wherein the sphere is coupled to an insertion rod which positions the sphere in the vein or artery, and which serves as a conduit for the fluid flow information.

26. The method as defined in claim 10 wherein the method further comprises utilizing the fluid flow measurement system to detect the direction and velocity of air flow in an airway, said method comprising the step of inserting an air flow sensing sphere into the airway, wherein the sphere is coupled to an insertion rod which positions the sphere in the airway, and which serves as a conduit for the fluid flow information.

27. The method as defined in claim 26 wherein the method further comprises inserting the air flow sensing sphere into a lung to thereby determine the direction and velocity of air flow.

28. A method for measuring a direction and velocity of fluid flow in three-dimensions by using a fluid flow measurement system, said method comprising the steps of:
   (1) providing a sphere which is disposed so as to allow generally unobstructed movement of a fluid around the sphere, including three orthogonally located apertures which pass completely through the sphere and which generally intersect at a center thereof, a plurality of sensors, at least one of which is disposed in each of the three orthogonally located apertures and which enable at least partial fluid flow therethrough, and a calculating device which receives information from the sensors; and
   (2) dynamically determining the direction and velocity of fluid flow around the sphere by measuring a velocity of fluid flow through each of the three orthogonally located apertures.

29. The method as defined in claim 19 wherein the method further comprises the step of building the fluid flow measurement system so as to require fluid flow through the system in order to take fluid flow measurements.

30. The method as defined in claim 19 wherein the method further comprises the step of calibrating the plurality of sensors by determining a rate of fluid flow through each of the three orthogonally located apertures when fluid flow is at a maximum rate, and when fluid flow is at a minimum rate.

31. The method as defined in claim 19 wherein the method further comprises the step of measuring the direction and velocity of fluid flow for a fluid which is moving at a velocity which is less than 1 mile per hour.

32. The method as defined in claim 19 wherein the method further comprises the step of determining the direction and velocity of fluid flow by applying vector algebra equations to the fluid flow velocity measurements generated by the plurality of sensors.

33. A system for measuring a direction and velocity of fluid flow in three-dimensions, said system comprising:
   a sphere which is disposed so as to allow generally free movement of a fluid around the sphere;
   a gimbal disposed inside the sphere;
   three arms which extend outwards from a suspension point, wherein the three arms form an orthogonal arrangement which is suspended at the suspension point on the gimbal such that the three arms are not in contact with the sides of the sphere;

three bipolar variable reluctance linear reactors, wherein each one of the three reactors are disposed upon each one of the three arms, and wherein each one of the three reactors provides a signal which is indicative of isotropic forces imposed upon the sphere by fluids flowing therearound; and a calculating device which receives information from the three reactors and calculates the direction and velocity of the fluid.

* * * * *